Patented Aug. 12, 1952

2,606,837

UNITED STATES PATENT OFFICE 2,606,837

BREAD BAKING

Harold A. Clark, Midland, Mich., assignor to Dow Corning Corporation, Midland, Mich., a corporation of Michigan No Drawing. Application June 15, 1949,
Serial No. 99,336

10 Claims. (Cl. 99—90)

The present invention relates to the art of baking bread and has particular reference to methods for the preparation of pans in which bread is baked and to methods for the baking of bread.

Bread baking is an art centuries old. Considerable progress has been made in recent years in this art. Despite the recent progress, certain of the methods which have been employed for many years are considered to be essential in the operation. One of these essential operations is the greasing of the bread pans. The greasing of pans is not only costly from the aspect of labor and material but is a messy operation which makes it almost impossible for the operators to keep their clothes and gloves clean. Inasmuch as the grease is normally applied with a brush, frequently bristles remain in the pan which are baked into the surface of the bread. In baking, the hot grease fouls the oven and makes an unpleasant odor. During baking the grease carbonizes. This causes blackened areas on the bottoms of the loaves of bread, and makes it necessary to have the pans cleaned frequently. Notwithstanding the use of considerable amounts of grease, the bread normally sticks in some of the pans, making it necessary to bang the pans in order to free the bread. More important than the waste of time involved in such an operation is the damage to the pans themselves. While this may sound like a rather crude operation for the present day, it is in fact the actual present status of most bakeries today.

The baking industry experienced its principal mechanical growth in the period from 1920 to 1929. Substantial improvements in the mechanization of bakeries have occurred since that time. Full mechanization of bakeries has been impossible in the handling of bread following the baking operation. Manual operation has been necessary due to variation in the release of bread from the pans. Mechanization of this portion of the bakery can be complete only when it is possible to obtain consistent and ready release of the bread from the pans.

Objects of the present invention are to avoid the shortcomings of pan greasing in the baking of bread, to provide methods for preparing bread pans which eliminate the necessity of greasing, to provide improved release of bread from baking pans, and to make possible the full mechanization of bakeries.

In accordance with the present invention, bread pans are coated internally with an organopolysilane resin. Following coating of the pans with the resin, the resin is dried to remove solvent. The pan so coated may be employed, either directly to bake bread in which case the resin is cured during use, or it may be heated to cure the resin and then used for baking. Bread may then be repeatedly baked in such pans without the necessity of using any grease.

Organopolysilane resins suitable for the present invention are polysilanes in which the silicon atoms in the molecules thereof are interconnected and the remaining valences of the silicon atoms are satisfied by phenyl and methyl radicals. In these resins there are from 1.2 to 2, inclusive, total phenyl and methyl radicals per silicon atom. Between 20 and 70 percent of the total phenyl and methyl radicals are phenyl radicals. In accordance with the method hereof these resins are prepared by the interaction of phenyl and methyl substituted silicon chlorides with an alkali metal. The silicon chloride mixture obtained is one which has the average formula $$(CH_3)_n(C_6H_5)_mSiCl_{4-n-m}$$

in which $n+m$ has a value of from 1.2 to 2, inclusive, and

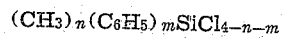

has a value from 0.2 to 0.70.

Suitable silanes for the preparation of the polysilane resins hereof are such materials as methyltrichlorosilane, phenyltrichlorosilane, phenylmethyldichlorosilane, diphenyldichlorosilane, dimethyldichlorosilane, triphenylchlorosilane, diphenylmethylchlorosilane, phenyldimethylchlorosilane and trimethylchlorosilane. These materials or any desired ones thereof may be employed and proportioned in such relative amounts as to provide mixtures of the defined character. It is preferred to employ silanes each of which has at least one phenyl radical bonded to the silicon atom. This is desirable inasmuch as these silanes which carry a phenyl radical are higher boiling than the methyl silanes which makes operation somewhat more easy.

The organochlorosilane mixture as above defined is interacted with the alkali metal. The alkali metal may be any of the well known alkali metals such as sodium, potassium, caesium or rubidium. Likewise, the sodium-potassium eutectic may be employed. It is preferred due to commercial availability, however, to employ either sodium or potassium.

For rapid rate of reaction it is desirable to have the alkali metal in a finely divided state. The alkali metal may conveniently be molten alkali metal dispersed in a diluent such as an aliphatic or aromatic hydrocarbon solvent. Likewise, a fine dispersion of the alkali metal in solid form in such a diluent may be employed. Such dispersions are known in the art. Alternatively, the sodium may be employed in the form of wire or small cut pieces. The temperature at which the reaction is conducted is not critical. However, in order to obtain rapid rate of reaction it is desirable to employ temperatures in excess of about 50° C. The reaction which is exothermic can conveniently be operated under reflux whereby the heat of reaction is dissipated by the cooling of refluxing solvent. In larger scale operation, as is well known in mechanical engineering, the heat of reaction may be dissipated by indirect heat exchange. The reaction is normally conducted at temperatures below 200° C. due to increasing danger at the elevated temperatures with the reactants which are employed. The silanes are maintained in liquid phase during the course of the reaction.

The reaction may be conducted either by adding the alkali metal to the organochlorosilanes or by adding the mixture of the organochlorosilanes to a dispersion of the alkali metal.

Following reaction of the organochlorosilanes loaf can be turned out of the pan which is then ready for another loaf. No banging of the pan is necessary to loosen the baked bread loaves.

Commercial bread pans were coated with organopolysilane resins prepared by reacting the indicated chlorides, in the amounts indicated in the following table, with molten metallic sodium. Some of the pans treated were old pans. These were cleaned with an organic solvent. The pans likewise contained some new pans. These were baked to burn off the lubricant which was employed in drawing the pans. The baking was continued until the entire surface of the tinned pans was no longer bright. The pans were then coated with the various resin solutions by spraying. Some of the pans were air dried for 30 to 60 minutes. Others were air dried for the indicated time, following which they were baked for from one to four hours at from 450° to 480° F. Plain loaf bread was then baked in both the cured and uncured pans. Both kinds of pans gave a perfect release for over 250 cycles. The pans were then cleaned and recoated for further baking.

The term "bread" herein is employed in its customary sense in the baking industry to refer to loaf bread and does not include pastries or other specialties.

| Resin | $CH_3SiCl_3$ | $C_6H_5SiCl_3$ | $C_6H_5CH_3SiCl_2$ | $(C_6H_5)_2SiCl_2$ | $(CH_3)_2SiCl_2$ | $C_6H_5(CH_3)_2SiCl$ |
|---|---|---|---|---|---|---|
| 1 | | | 100 | | | |
| 2 | | | 50 | | 50 | |
| 3 | | | 75 | | 25 | |
| 4 | | | | 50 | 50 | |
| 5 | | | 75 | 25 | | |
| 6 | 10 | | 90 | | | |
| 7 | | | 50 | | | |
| 8 | | 50 | 33⅓ | | | 33⅓ |
| 9 | | 33⅓ | 80.8 | | | 5.8 |
| 10 | | 13.4 | 85 | | | |
| 11 | 10 | 15 | 70 | | 10 | |

The indicated proportions of chlorides employed in making the above resins are in mol. percentages.

and the alkali metal, the product may be purified to separate it from the salt which is by-produced and from any residual alkali metal. This purification may be affected by conventional procedures such as filtering, washing with alcohol to react with the alkali metal, and washing with water.

The pans to which the resin is applied should be clean in order to obtain the best results. In case the pans are new, the temporary coating should be burned off in accordance with customary bakery practice. If used pans are to be employed, they should be cleaned of all grease and flour. Conventional bakery cleaning practice is satisfactory for this purpose. It is desirable for the pans to be relatively free of fingerprints at the time of coating with the resin.

The pans are then coated with a solution of the organopolysilane resin. Coating may be effected by spraying, brushing or dipping. Any excess resin is drained from the pans and the pans are then dried. The pans which carry a resin coating on their internal surfaces are then allowed to air dry. If desired the resin may be cured by heating to a temperature of from 400° to 500° F., though this is not necessary as the resin will cure during baking of bread. The degree of cure may be increased by heating at a higher temperature, or for a longer time or by the inclusion of a catalyst in resin.

The pans so prepared which carry a film of cured resin are then ready for the baking operation. The loaf to be baked is placed in the pan without greasing of the pan. After baking the That which is claimed is:

1. The method of preparing a bread pan for the baking of bread which comprises coating the internal surfaces of the pan with a phenyl and methyl substituted polysilane resin.

2. The method in accord with claim 1 in which the resin is cured by heating.

3. The method of preparing a bread pan for the baking of bread which comprises coating the internal surfaces of the pan with an organopolysilane resin in which the silicon atoms in the molecules thereof are interconnected, by silicon to silicon bonding, the remaining valences of the silicon atoms being satisfied by phenyl and methyl radicals, which resin contains from 1.2 to 2 inclusive total phenyl and methyl radicals per silicon atom and in which resin between 20 and 70 per cent of such total phenyl and methyl radicals are phenyl radicals.

4. The method in accordance with claim 3 in which the resin is cured by heating the coated pan to between 400° and 500° F.

5. The method of baking bread which comprises baking the bread in contact with a supported film of a phenyl and methyl substituted polysilane resin.

6. The method of baking bread which comprises baking the bread in contact with a supported film of an organopolysilane resin in which the silicon atoms in the molecules thereof are interconnected, by silicon to silicon bonding, the remaining valences of the silicon atoms being satisfied by phenyl and methyl radicals, which resin contains from 1.2 to 2 inclusive total phenyl and methyl radicals per silicon atom and in which resin between 20 and 70 per cent of such total phenyl and methyl radicals are phenyl radicals, whereby release of the bread baked in the pan is obtained without the use of grease.

7. The method which comprises coating the internal surfaces of a bread pan with a phenyl and methyl substituted polysilane resin, curing the resin by heating and repeatedly baking bread in the pan so coated with the bread in contact with the resin during baking, whereby release of the bread in the pan is obtained without the use of grease.

8. The method which comprises coating the internal surfaces of a bread pan with an organopolysilane resin in which the silicon atoms in the molecules thereof are interconnected, by silicon to silicon bonding, the remaining valences of the silicon atoms being satisfied by phenyl and methyl radicals, which resin contains from 1.2 to 2 inclusive total phenyl and methyl radicals per silicon atom and in which resin between 20 and 70 per cent of such total phenyl and methyl radicals are phenyl radicals, and repeatedly baking bread in the pan so coated with the bread in contact with the resin during baking, whereby release of the bread baked in the pan is obtained without the use of grease.

9. A utensil for baking bread consisting of a bread pan coated with a phenyl and methyl substituted polysilane resin.

10. A utensil for baking bread consisting of a bread pan coated with an organopolysilane resin in which the silicon atoms in the molecules therof are interconnected by silicon to silicon bonding, the remaining valences of the silicon atoms being satisfied by phenyl and methyl radicals, which resin contains from 1.2 to 2 inclusive total phenyl and methyl radicals per silicon atom and in which resin between 20 and 70 per cent of such total phenyl and methyl radicals are phenyl radicals.

HAROLD A. CLARK.

REFERENCES CITED

The following references are of record in the file of this patent:

UNITED STATES PATENTS

| Number | Name | Date |
| --- | --- | --- |
| 2,462,242 | Webb et al. | Feb. 22, 1949 |
| 2,470,593 | Webb et al. | May 17, 1949 |

OTHER REFERENCES

Baker's Helper, July 9, 1949, pages 59–62.
"How to Use DC Pan Glaze," Reference No. E-8, revised July 1948, Dow Corning Corporation, Midland, Michigan.